(12) United States Patent
Manasek

(10) Patent No.: US 11,365,936 B2
(45) Date of Patent: Jun. 21, 2022

(54) CASSETTE DESIGN DROP OUT BOX, COMBUSTION CHAMBER, DUCT AND ELECTRIC ARC FURNACE UPPER SHELL SYSTEM

(71) Applicant: AMERIFAB, INC., Indianapolis, IN (US)

(72) Inventor: Richard J. Manasek, Carmel, IN (US)

(73) Assignee: AMERIFAB, INC., Indianapolis, IN (US)

( * ) Notice: Subject to any disclaimer, the term of this patent is extended or adjusted under 35 U.S.C. 154(b) by 1031 days.

(21) Appl. No.: 16/006,959

(22) Filed: Jun. 13, 2018

(65) Prior Publication Data

US 2018/0363984 A1   Dec. 20, 2018

Related U.S. Application Data

(60) Provisional application No. 62/518,838, filed on Jun. 13, 2017.

(51) Int. Cl.
| | |
|---|---|
| *F27D 9/00* | (2006.01) |
| *F27B 3/26* | (2006.01) |
| *F27B 3/08* | (2006.01) |
| *F27D 11/08* | (2006.01) |
| *F27D 17/00* | (2006.01) |
| *H05B 7/06* | (2006.01) |
| *C21C 5/52* | (2006.01) |
| *F27D 99/00* | (2010.01) |

(52) U.S. Cl.
CPC ............... *F27D 11/08* (2013.01); *C21C 5/52* (2013.01); *F27B 3/085* (2013.01); *F27B 3/26* (2013.01); *F27D 9/00* (2013.01); *F27D 17/003* (2013.01); *F27D 17/004* (2013.01); *H05B 7/06* (2013.01); *F27D 2099/0021* (2013.01)

(58) Field of Classification Search
None
See application file for complete search history.

(56) References Cited

U.S. PATENT DOCUMENTS

| | | | | |
|---|---|---|---|---|
| 3,049,200 A | * | 8/1962 | Gordon | F27D 1/00 |
| | | | | 52/348 |
| 4,091,228 A | * | 5/1978 | Brown, Jr | F27D 9/00 |
| | | | | 373/76 |
| 4,337,824 A | | 7/1982 | Kirk | |

(Continued)

FOREIGN PATENT DOCUMENTS

| | | | | |
|---|---|---|---|---|
| WO | WO-2012026798 A2 | * | 3/2012 | F27B 3/24 |

*Primary Examiner* — Ibrahime A Abraham
*Assistant Examiner* — Elizabeth M Sims
(74) *Attorney, Agent, or Firm* — Taft Stettinius & Hollister LLP; Stephen F. Rost

(57) ABSTRACT

An enclosure of a steel-making furnace system includes a support structure including a frame that defines an interior, a supply line for supplying a cooling liquid from a reservoir, and a return line fluidly coupled to the supply line and the reservoir. A plurality of panels includes sinuously winding piping having an inlet and an outlet. The inlet is fluidly coupled to the supply line and the outlet is fluidly coupled to the return line. The frame includes a plurality of support members spaced from one another, where each of the plurality of support members defines a slot. Each of the plurality of panels is removably and slidably received with the slot for coupling to the frame.

19 Claims, 12 Drawing Sheets

(56) References Cited

U.S. PATENT DOCUMENTS

| | | | | |
|---|---|---|---|---|
| 4,455,017 A | * | 6/1984 | Wunsche | F27B 3/24 |
| | | | | 266/190 |
| 4,658,761 A | | 4/1987 | Duggan | |
| 4,674,728 A | * | 6/1987 | Aune | F27D 1/12 |
| | | | | 266/193 |
| 4,694,864 A | | 9/1987 | Libin | |
| 4,730,452 A | * | 3/1988 | Kallman | F23M 5/00 |
| | | | | 60/39.464 |
| 6,964,297 B1 | * | 11/2005 | Janezich | F28F 9/14 |
| | | | | 165/173 |
| 7,895,957 B2 | | 3/2011 | Inomata et al. | |
| 2004/0194940 A1 | * | 10/2004 | Manasek | C21C 5/40 |
| | | | | 165/168 |
| 2013/0206358 A1 | * | 8/2013 | Maddalena | F27D 1/00 |
| | | | | 52/348 |

* cited by examiner

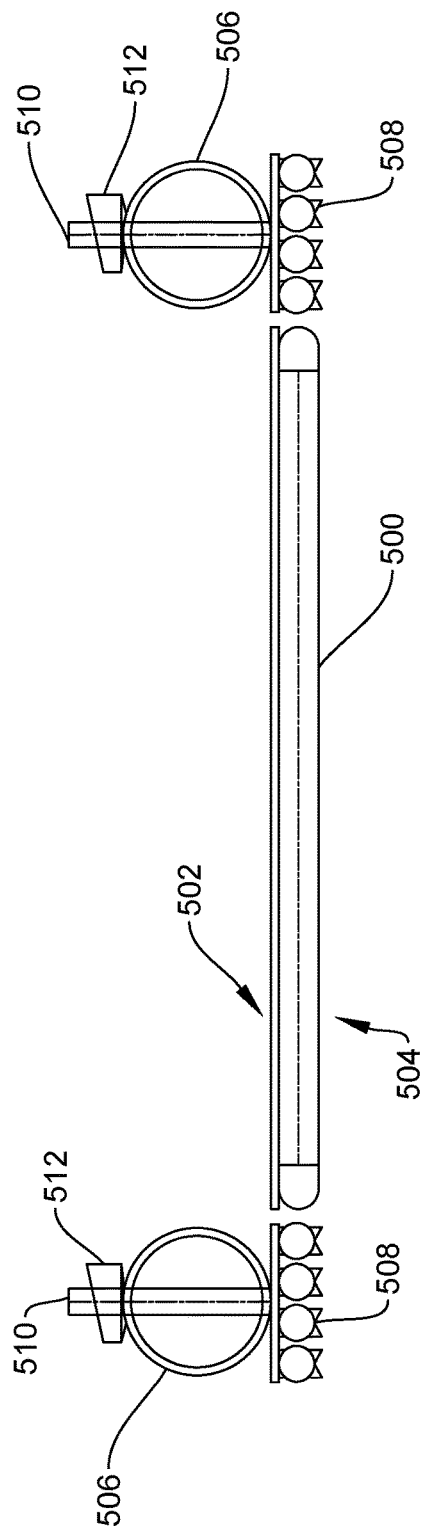
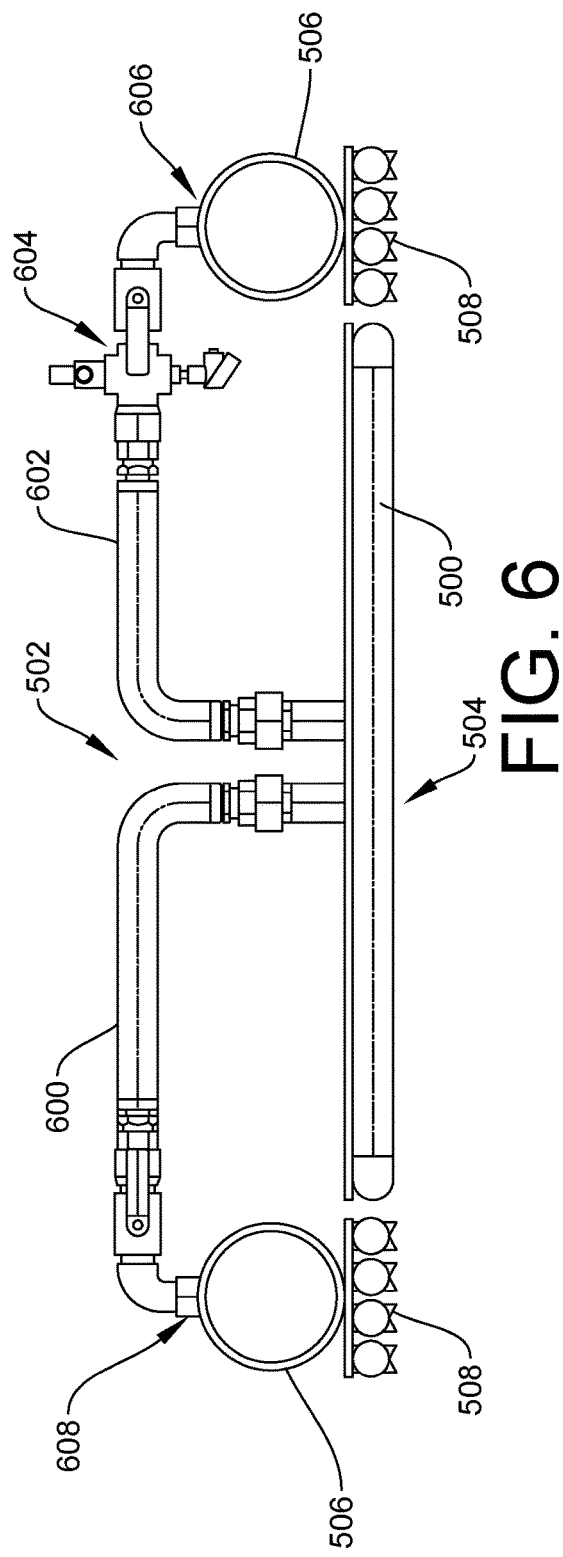

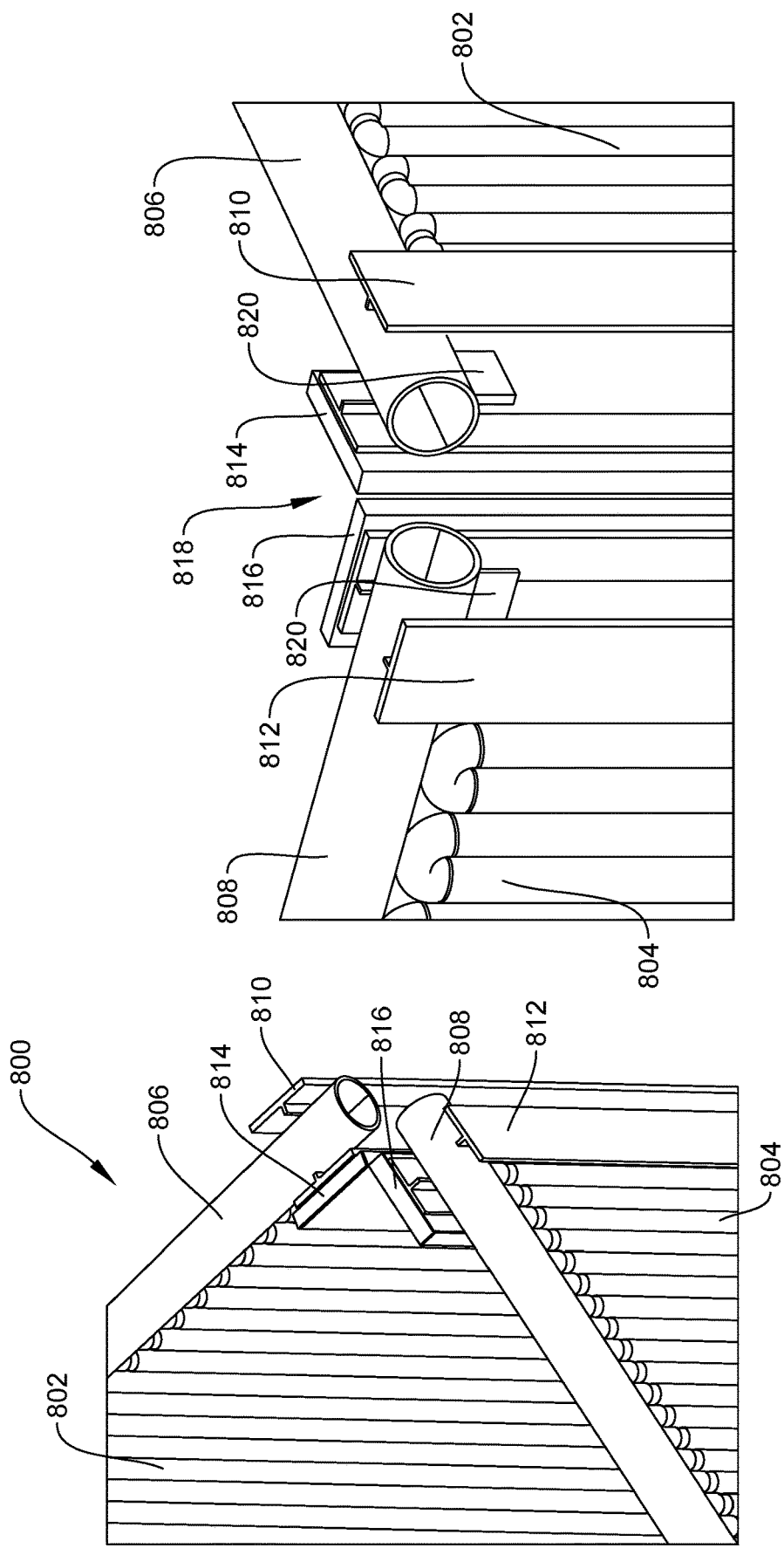

CASSETTE DESIGN DROP OUT BOX, COMBUSTION CHAMBER, DUCT AND ELECTRIC ARC FURNACE UPPER SHELL SYSTEM

RELATED APPLICATIONS

The present application claims the benefit of U.S. Provisional Application Ser. No. 62/518,838, filed Jun. 13, 2017, the disclosure of which is hereby incorporated by reference in its entirety.

FIELD OF THE DISCLOSURE

The present disclosure relates to a furnace, and, in particular, to an electric arc furnace having a plurality of water-cooled panels.

BACKGROUND

There are generally several methods for designing and manufacturing water cooled Upper Shells for Electric Arc Furnaces (EAF) and Combustion Chambers, Drop Out Boxes and Ducts for EAF's, Power Plants, Basic Oxygen Furnaces and other types of furnaces, ovens and process plants. Due to the heat generated inside a furnace, for example, it is necessary to provide a cooling means to control the heat generation. Moreover, conventional ducts or enclosures may include equipment designed as a monolithic structure manufactured with pipe or plate having all supply and return piping attached to the outer walls of the equipment. In this design, the entire device must be removed in the event of incidental damages.

In nearly all cases, this equipment is installed in difficult to access areas inside a building of a manufacturing facility or is completely integrated plant process equipment. The interior water cooled element working side of these devices have a limited operating life and can only be accessed from inside the equipment. Due to the limited operating life of the interior water cooled elements, the repair and replacement of damaged portions of the equipment require a scheduled or unscheduled downtime to implement or require that the entire device be removed from the process or building and replaced. Removing or replacing the equipment can be costly from a labor, equipment and material perspective.

Another significant cost associated with this equipment design is that the removal and reinstallation time can require several days or even weeks of plant downtime. This results in significant loss of valuable production time. In today's modern processing plants and other manufacturing facilities, it is imperative process and equipment up-time is maintained at the highest level possible with little or no downtime, whether "planned" or "unplanned". The bottom line profit losses can be substantial with any downtime.

SUMMARY

In one aspect of this disclosure, a permanent support structure is disclosed herein which takes the place of a conventional support structure that is replaced with every water cooled element replacement. The permanent support structure may provide a savings on replacement cost since the only replacements required after the initial installation are the water cooled internal elements.

In another aspect, this disclosure provides water cooled elements which may be reversible, thus increasing and, in some instances, doubling their operating life.

Moreover, the water cooled elements may be provided in a "cassette" design for simple insertion into the permanent support structure.

In a further aspect of this disclosure, the small "cassette" design water cooled elements can be manufactured with different materials to address the operational needs of their location within the support structure.

In effect, the embodiments of the present disclosure may increase the operating life of the entire system and reduces maintenance thereof, thereby increasing productivity and performance levels and leading to higher profit. Moreover, the cassette panels described herein may be manufactured in any style desired including a plurality of pipe/tube or plate designs, any material such as steel, alloy, casting, extruded materials, and any style such as pressurized water, spray cooling, etc.

In one embodiment of the present disclosure, a drop out box of a steel-making furnace system includes a support structure comprising a frame that defines an interior; a supply line for supplying a cooling liquid from a reservoir; a return line fluidly coupled to the supply line and the reservoir; and a plurality of panels comprising sinuously winding piping having an inlet and an outlet, the inlet being fluidly coupled to the supply line and the outlet being fluidly coupled to the return line; wherein, the frame comprises a plurality of support members spaced from one another, where each of the plurality of support members defines a slot; wherein, each of the plurality of panels is removably and slidably received with the slot for coupling to the frame.

In one example of this embodiment, a first flexible hose couples the supply line to the inlet and a second flexible hose for coupling the return line to the outlet. In a second example, a supply header is fluidly coupled to the supply line and includes a plurality of orifices, where each of the plurality of orifices is fluidly coupled to an inlet of the plurality of panels; and a return header is fluidly coupled to the return line and comprising a plurality of orifices, where each of the plurality of orifices is fluidly coupled to an outlet of the plurality of panels. In a third example, the supply header is disposed along a top portion of the plurality of panels and coupled to the frame; and the return header is disposed along a bottom portion of the plurality of panels and coupled to the frame.

In a fourth example, the inlet of each of the plurality of panels is located at the top portion and the outlet of each of the plurality of panels is located at the bottom portion. In a fifth example, the supply header is disposed along a bottom portion of the plurality of panels and coupled to the frame; and the return header is disposed along a top portion of the plurality of panels and coupled to the frame. In a sixth example, the inlet of each of the plurality of panels is located at the bottom portion and the outlet of each of the plurality of panels is located at the top portion.

In a seventh example, the supply header is disposed along a first side portion of the plurality of panels and coupled to the frame; and the return header is disposed along a second side portion of the plurality of panels and coupled to the frame, the first side portion being opposite the second side portion. In an eighth example, the inlet of each of the plurality of panels is located at the first side portion thereof and the outlet of each of the plurality of panels is located at the second portion. In a ninth example, a valve is fluidly coupled to each inlet of the plurality of panels, the valve configured to control the supply of cooling liquid to each panel.

In another example of this embodiment, the support structure comprises a buckstay and a protective panel, the protective panel disposed on an interior side of the buckstay. Here, each of the plurality of panels is disposed between the buckstay and the protective panel. In a further example, the plurality of panels comprises a first face and a second face, the plurality of panels being reversible such that either the first face or the second face is disposable to face the interior. In yet a further example, the plurality of panels comprises a first end and a second end, the plurality of panels being disposed within the slot such that either the first end or the second end is positioned at a top of the drop out box.

In another embodiment of the present disclosure, an enclosure of a steel-making furnace system includes a support structure comprising a frame that defines an interior; a supply line for supplying a cooling liquid from a reservoir; a return line fluidly coupled to the supply line and the reservoir; and at least one panel comprising sinuously winding piping and a shaft having an inlet and an outlet, the inlet being fluidly coupled to the supply line and the outlet being fluidly coupled to the return line; and a plug located within the shaft between the inlet and the outlet, the plug configured to direct a flow of the cooling liquid through the sinuously winding piping; wherein, the frame comprises a plurality of support members spaced from one another; wherein, a first end of the shaft is coupled to a first support member and a second end of the shaft is coupled to a second support member, the first and second support members being spaced from one another.

In one example of this embodiment, the shaft defines a pivot axis about which the at least one panel is pivotally coupled to the first and second support members. In a second example, the at least one panel comprises a first face and a second face, the at least one panel being coupled to the first and second support members such that either the first face or the second face is oriented towards the interior. In a third example, the at least one panel is pivotable about the pivot axis such that the first face is positioned towards the interior during a first period of time, and the at least one panel is pivoted after the first period of time such that the second face is positioned towards the interior. In a fourth example, the sinuously winding piping comprises a first circuit of sinuously winding piping and a second circuit of sinuously winding piping; the first circuit of sinuously winding piping including a first inlet and a first outlet; the second circuit of sinuously winding piping including a second inlet and a second outlet; and the first and second inlets being fluidly coupled to the shaft inlet and the supply line, and the first and second outlets being fluidly coupled to the shaft outlet and the return line.

In a further embodiment of the present disclosure, a steel-making furnace system includes a furnace comprising a hearth, an upper shell having one or more cooling panels, and a removable roof structure for covering a top end of the upper shell; an exhaust system disposed in fluid communication with the furnace, the exhaust system configured to transfer fumes and hot gases from the furnace to an exhaust chamber; and a drop out box located below the exhaust chamber and defining an enclosure for receiving debris and other particulates from the fumes and hot gases, the drop out box including a frame structure that defines an interior of the enclosure; a supply line for supplying a cooling liquid from a reservoir; a return line fluidly coupled to the supply line and the reservoir; and a plurality of panels removably coupled to the frame structure and comprising sinuously winding piping having an inlet and an outlet, the inlet being fluidly coupled to the supply line and the outlet being fluidly coupled to the return line; wherein, the frame comprises a plurality of support members spaced from one another, where each of the plurality of support members defines a slot for receiving one of the plurality of panels such that each panel of the plurality of panels is removably disposed with the slot; wherein, the plurality of panels comprises a first end, a second end, a first face and a second face, each of the plurality of panels being reversible such that the panel is coupled to the frame with either the first face or the second face oriented towards the interior of the enclosure; further wherein, each of the plurality of panels being disposable within the slot such that either the first end or the second end is positioned closer to the exhaust chamber.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 5 is a first schematic view of a modular panel installed between a pair of round header pipes;

FIG. 6 is a second schematic view of a modular panel installed between a pair of round header pipes;

FIG. 8A is a partial perspective view of a second embodiment of modular panels assembled with an independent structure of an enclosure;

FIG. 8B is a second partial perspective view of the second embodiment of FIG. 8A;

Corresponding reference numerals are used to indicate corresponding parts throughout the several views.

DETAILED DESCRIPTION

The embodiments of the present disclosure described herein are not intended to be exhaustive or to limit the disclosure to the precise forms disclosed in the following detailed description. Rather, the embodiments are chosen and described so that others skilled in the art appreciate and understand the principles and practices of the present disclosure.

The present disclosure relates to an electric arc furnace, but is applicable to various equipment and industries. Moreover, the present disclosure relates to a method for improving equipment design, manufacture, operation, maintenance and longevity. Further, the present disclosure provides an improvement to the on-line availability of the process equipment.

Figure 1:
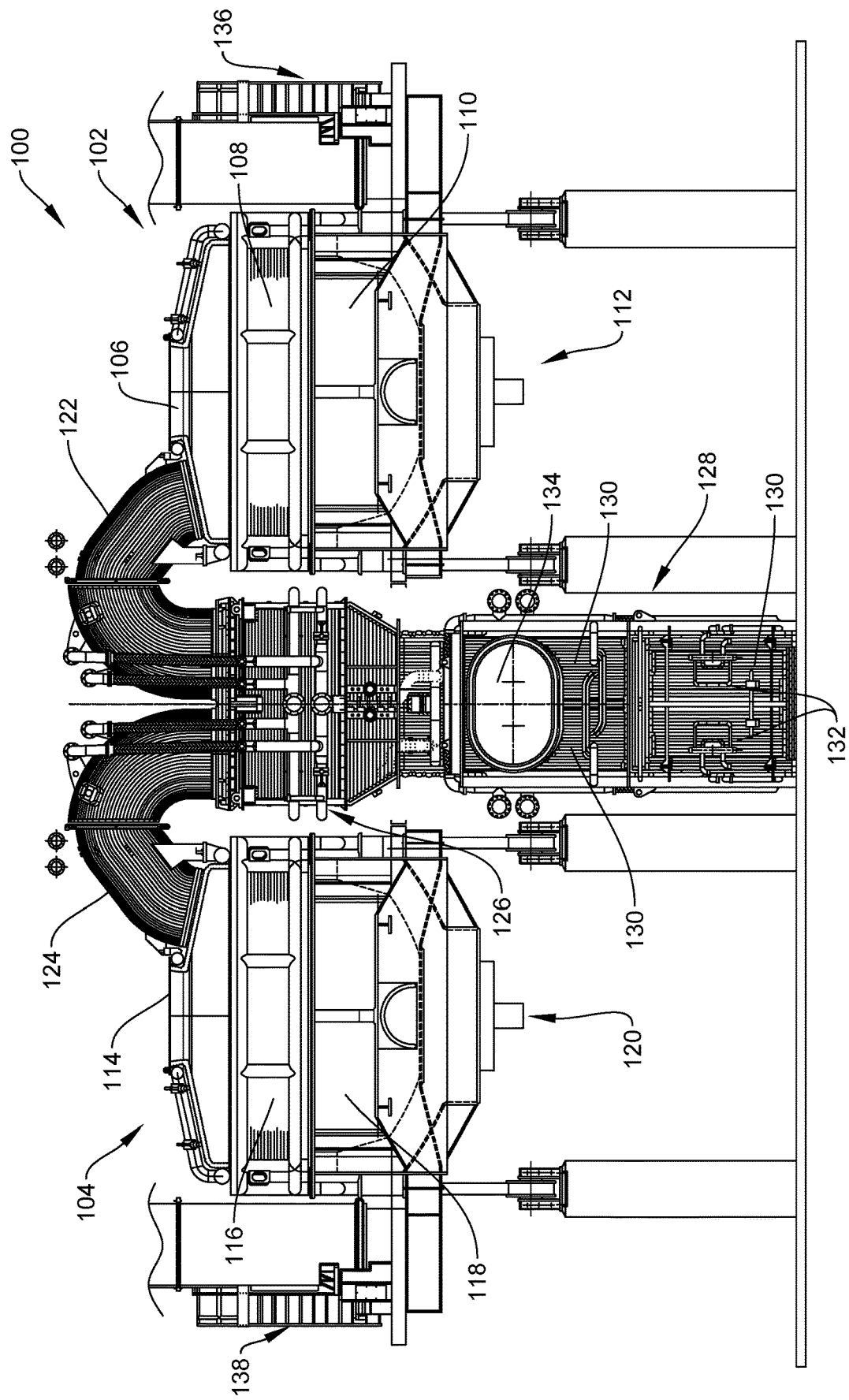
FIG. 1 is a schematic view of a twin shell electric arc furnace with a drop box system.

An example of an EAF Upper Shell is shown in FIG. 1 of the present disclosure, where the EAF is shown as a dual or twin shell furnace 100 having a first furnace system 102 and a second furnace system 104. Although not shown, both furnace systems may share a single electric or power system including one or more electrodes. The first furnace system 102 is shown including an upper roof structure 106, an upper shell 108 formed by a frame and liquid-cooled panels, and a first hearth 110. A first platform system 136 may be used to access the first furnace system 102 to perform maintenance and repairs. Similarly, the second furnace system 104 may include a second roof structure 114, a second upper shell 116, and a second hearth 118. A second platform system 138 may be used to access the second furnace system 104 to perform maintenance and repairs. A first tapping assembly 112 may be associated with the first furnace system 102 as is commonly known in the industry, and a second tapping assembly 120 may be associated with the second furnace system 104.

In the embodiment of FIG. 1, the conventional first and second EAF upper shells 108, 116 may be commonly referred to as a structure manufactured from a plate, large diameter pipe and the combination of plate and pipe that supports water cooled panels that are suspended on the inner diameter of the top ring of the upper shell. The water cooled sidewall panels may be suspended using a top plate flange, interconnected flanges, T-bars, pins or brackets (not shown) on the exterior cold face of the panels all of which attach to the respective brackets on the upper shell. One disadvantage of this design is the difficulty to remove and replace the sidewall panels when an unscheduled damage or downtime is experienced. Often, repairs of these sidewall panels require personnel to access the panels from the interior of the upper shell, thereby resulting in significant downtime and loss of productivity.

Returning to FIG. 1, fumes and hot gases may exit the respective furnace systems an evacuation system. As shown, fumes may exit the first furnace system 102 via a first elbow exhaust 122 and enter a central exhaust chamber 126. Likewise, fumes and hot gases exiting the second furnace system 104 may do so via a second elbow exhaust 124 and enter the central exhaust chamber 126. The fumes exiting the furnace systems may flow at a high velocity through the respective elbows, but as the fumes reach the exhaust chamber 126, the diameter of the chamber 126 is greater than that of each elbow thereby resulting in particulates such as dust and other heavier debris to "fall out" of the gas stream and collect in a drop box system 128 as shown in FIG. 1. The drop out box system 128 may include a door or pair of doors 132 to allow a utility vehicle, tractor or loader to enter and remove the dust particles and other particulates therefrom. The fumes and other gases may exit the chamber 126 and drop out box system 128 through a passage 134 to a backhouse, as is known in the art.

Figure 2:
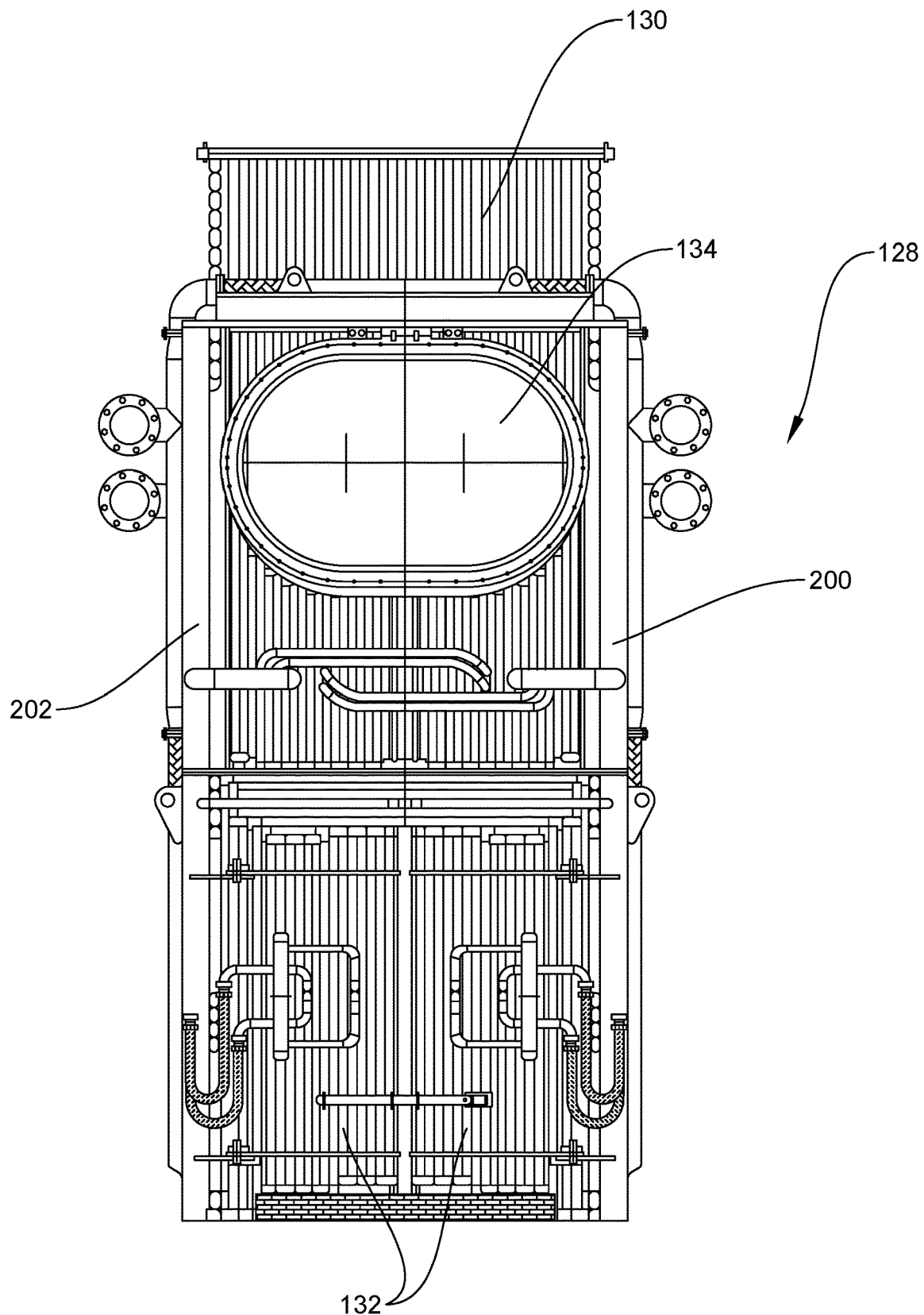
FIG. 2 is a front schematic view of the drop out box of FIG. 1 including a large panel liquid-cooled structure.

The conventional combustion chamber and drop out box 128 shown in FIG. 1 includes a group of water cooled wall and roof panels 130, configured to the required geometry that are bolted together. In FIG. 2, main water supply and return lines 200, 202 respectively are welded to each panel 130 and interconnected between panels 130. Damaged panels require complete disassembly of the panels and header systems for replacement. Likewise, they can also be designed as a monolithic structure manufactured with pipe or plate having all supply and return piping attached to the outer walls of the equipment. In this illustrated design, the entire device must be removed in the event of incidental damage. Further, access to disassemble or repair damaged panels is from the inside or interior of the chamber or drop out box. Thus, the entire system is shut down in order for the repairs or replacement work to be carried out, thereby causing significant downtime and loss of productivity.

Although the present disclosure is directed more towards the use of modular or cassette-style water cooled wall and roof panels for a combustion chamber, drop out box or other type of enclosure, the principles and teachings thereof may also apply to an EAF. Thus, the following description of an EAF is provided such that these principles and teachings may be applied thereto.

In an electric arc furnace (EAF), a portion above a hearth or smelting area must be protected against the high internal temperatures of the furnace. The EAF vessel wall, cover or roof and duct work are particularly at risk from massive thermal, chemical, and mechanical stresses caused by charging the steel. Such stresses greatly limit the operational life of the furnace. The EAF is generally designed and fabricated as a welded steel structure which is protected against the high temperatures inside the furnace vessel by a refractory lining and water cooled panels. Water-cooled roof panels and water-cooled sidewall panels are located in portions of the furnace vessel above the melting/smelting area of the furnace.

In addition, furnace off-gas ducts are also comprised of a plurality of pipe around its circumference that protect the ductwork from the high temperatures and caustic gases produced during furnace operation. Existing water-cooled panels and ducts are made both with various grades and types of plates and pipes. Using water-cooled panels reduces refractory costs, enables steel makers to operate each furnace for a greater number of heats and enables the furnaces to operate at increased levels of power and chemical energy input. Such panels are designed to incorporate a plurality of pipes in serpentine fashion and hung on the inside wall of the electric arc furnace above the hearth, thereby forming a cooling surface between the interior and the furnace wall.

It is important to maintain a layer of slag on the hot side of the water cooled panels to protect the panels from thermal and arcing degradation during normal furnace operation. Slag cups, slag bars, slag pins and specially designed extruded pipe with splines on the hot side surface of the pipe may be used to retain splattered slag on the hot side surface of the panels. Slag solidifies on the pipes, forming an insulation barrier between the molten iron material and the cooling pipes and, consequently, the wall of the furnace.

Figure 12:
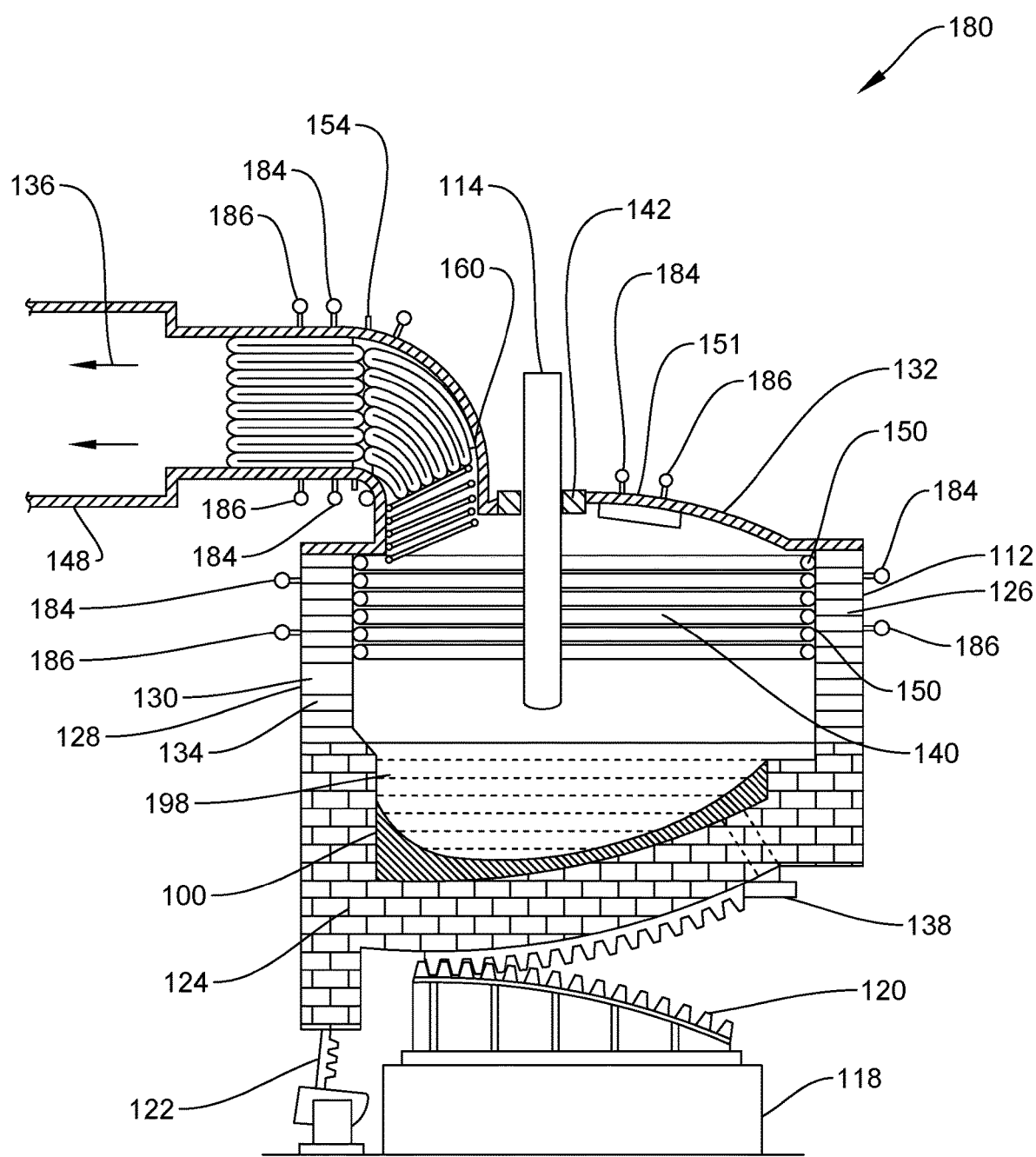
FIG. 12 is a cross-sectional schematic of a steel-making furnace.

Referring to FIG. 12, one embodiment of a furnace is illustrated as an EAF type furnace 180. While the EAF is disclosed as one example, it is understood the principles and teachings of the present disclosure may be readily applied in a basic oxygen furnace (BOF) and the like. In FIG. 12, an EAF 180 may include a furnace shell 112, a plurality of electrodes 114, an exhaust system 116, a working platform 118, a rocker tilting mechanism 120, a tilt cylinder 122, and an off gas chamber. The furnace shell 112 may be movably disposed upon the rocker tilt 120 or other tilting mechanism. Further, the rocker tilt 120 may be powered by the tilt cylinder 122. The rocker tilt 120 may also be further secured upon the working platform 118.

The furnace shell 112 may include a dished hearth 124, a generally cylindrical side wall 126, a spout 128, a spout door 130, and a general cylindrical circular roof 132. The spout 128 and spout door 130 are located on one side of the cylindrical side wall 126. In the open position, the spout 128 may allow intruding air 134 to enter the hearth 124 and partially burn gasses 136 produced from smelting. The hearth 124 is formed of a suitable refractory material. At one end of the hearth 124 is a pouring box having a tap means 138 at its lower end. During a melting operation, the tap means 138 is closed by a refractory plug, or a slidable gate. Thereafter, the furnace shell 112 is tilted, the tap means 138 is unplugged, or open and molten metal is poured into a teeming ladle, tundish, or other device, as desired.

The inside wall 126 of the furnace shell 112 may be fitted with water cooled panels 140 of sinuously winding piping 150. The panels, in effect serve as an interior wall in the furnace 180. The manifolds, which supply cool water and a return, are in fluid communication with the panels 140. Typically, the manifolds are positioned peripherally in a fashion similar to the illustrated exhaust ducts 144.

The heat exchanger system 110 produces a more efficient operation and prolongs the operation life of the EAF furnace 110. In one illustrative embodiment, the panels 140 may be assembled such that the sinuously winding piping has a generally horizontal orientation. The piping 150 can be linked with a linkage or have a base that is mounted to the wall. Alternatively, the panels 140 can be mounted such that the sinuously winding piping 150 has a generally vertical orientation. The upper ends of the panels 140 may define a circular rim at the upper margin of the side wall 126 portion of the furnace 180.

The heat exchanger system 110 can be fitted to the roof 132 of the furnace 180, wherein the water cooled panels 140 have a curvature that substantially follows the domed contour of the roof 132. The heat exchanger system 110 may be deployed on the inside of side wall 126 of the furnace 180, the roof 132 and the entrance of the exhaust system 116, as well as throughout the exhaust system 116. As such, the heat exchanger system 110 can protect the furnace and cools the hot waste gasses 136 as they are ducted to a bag house or other filtering and air treatment facilities, where dust is collected and the gasses are vented to the atmosphere.

In operation, hot waste gasses 136, dust and fumes are removed from the hearth 124 through a vent 146 in the furnace shell 112. The vent 146 may be in communication with an exhaust system.

The panel 140 can have a plurality of axially arranged pipes 150. U-shaped elbows can connect adjacent sectional lengths of piping or pipes 150 together to form a continuous piping system. Linkages and the like that additionally serve as spacers may be between adjacent pipes 150, and they provide structural integrity of the panel 140 and are determinative of curvature to the panel 140.

The heat exchange system or heat exchanger 110 may include at least one panel of the sinuously winding piping 150 having an inlet (not shown) and an outlet (not shown), an input manifold in fluid communication with the inlet of the at least one panel, an-output manifold in fluid communication with the outlet of the at least one panel, and a cooling fluid flowing through the piping 150. The heat exchanger system 110 cools hot fume gasses 136 and dust that is being evacuated from the metallurgical furnace 180 and its supporting components. The piping is an assemblage of sectional lengths of connected tubes mounted side-by-side, wherein the connected tubes are secured to each other with the linkage, therein forming the at least one panel 150.

It has been determined that one illustrative and desirable composition for fabricating the piping 150 is of an aluminum bronze alloy. Aluminum bronze alloys have been found to have a higher than expected thermal conductivity, resistance to etching by the stream of hot gasses (modulus of elasticity), and good resistance to oxidation. Thus, the operational life of the heat exchanger is extended. Corrosion and erosion of the heat exchanger and related components is reduced, when they are fabricated with aluminum bronze. Aluminum bronze has thermal conductivity that is 41% higher than P22 (about 96% Fe, 0.1% C, 0.45% Mn, 2.65% Cr, 0.93% Mo) and 30.4% than carbon steel (A106B). The heat exchangers fabricated using aluminum bronze and alloys thereof are more efficient, and have a longer operational life than furnace constructed of refractive materials and or other metal alloys.

It has also been determined that the piping 150 may be extruded, and that extruding may help the piping resist corrosion, erosion, pressure, and thermal stress. The piping can be curved or bent to match the curvature of a wall to which it is being attached, if so needed. More typically, the individual sections of piping are secured to each other with an angled linkage such that the resulting panel has a curvature that is comparable to the curvature of the wall.

Figure 3:
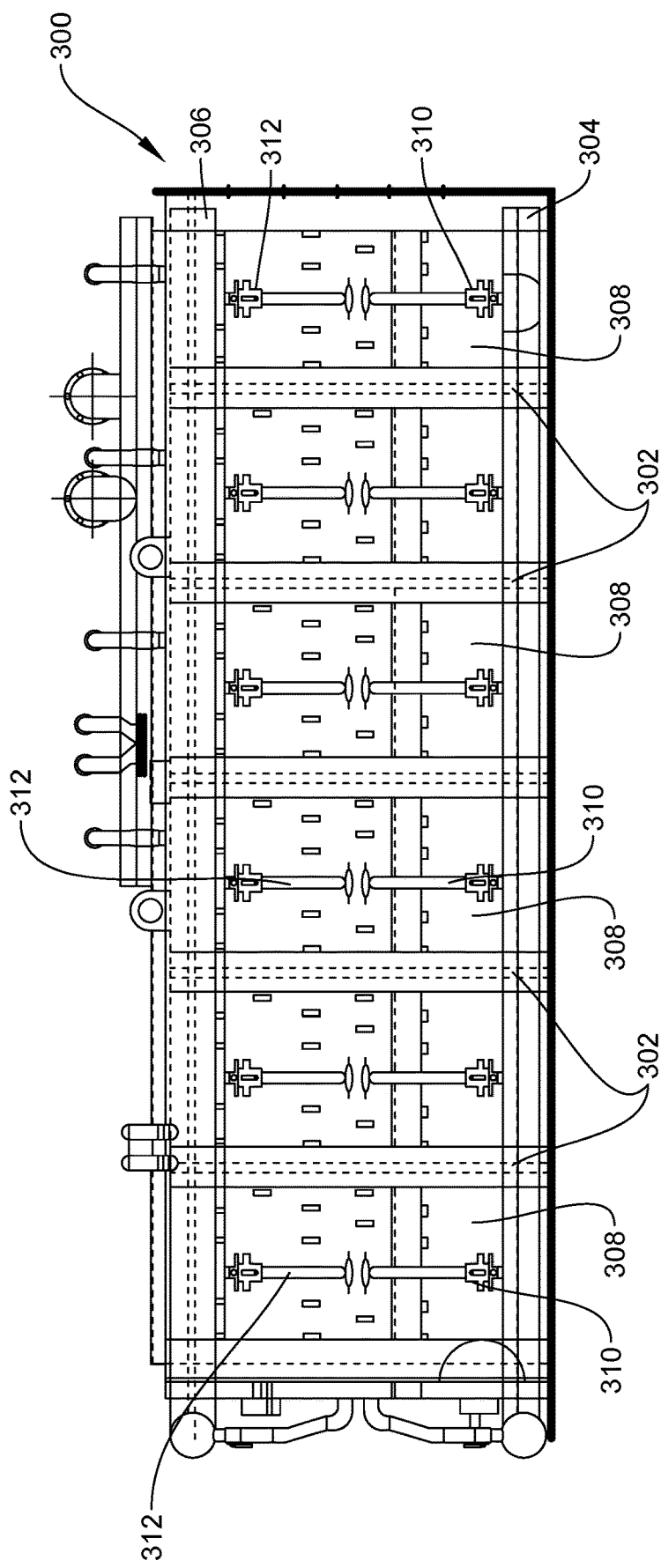
FIG. 3 is a schematic view of an independent structure with a plurality of modular liquid-cooled panels.

Referring to FIG. 3, one embodiment of the present disclosure is shown. Here, a portion of a drop out box system 300 or other enclosure is illustrated including a plurality of independent, modular water or liquid cooled panels 308. Here, the system 300 may include an independent support structure 302 forming a frame as shown. The independent support structure 302 may be manufactured to remain in place without needing to be replaced during the operating life of the manufacturing facility. The support structure 302 may be formed by one or more buckstays or other members. A buckstay may be a beam held by stays to the exterior of a wall, such as that of a furnace or boiler, to keep the adjacent areas of the wall from being forced outward.

Headers may be provided in the system 300 and which remain in place on the permanent support structure 302 such that only the water-cooled elements or panels 308 are turned around or replaced, as required, due to normal wear and tear. The structure can be a water cooled design or a Pipe/Plate/I-Beam non-water cooled design as required by the specific application and equipment location. The structure may incorporate the necessary infrastructure for water supply and return headers 304, 306, respectively, with water connections for the water cooled elements or panels 308 to be installed on the cold side (i.e., the exterior) of the structure as well as, guideways, slots or brackets to attach the water cooled elements to the structure. As a result, the structure 302 and its related infrastructure may remain substantially fixed and unchanged. In effect, this may allow for the easy replacement of the water cooled elements or panels 308 when they are damaged due to normal operating conditions.

The water cooled operating elements or panels 308 of the equipment can be manufactured from a plurality of pipe, plate, or plate/channels in conjunction with many material types that provide the optimal thermal conductivity, water pressure drop and resistance to the hot and dirty gases that they are exposed to during process operations. Two features of this embodiment is that the water cooled elements may be designed with simplified installation and removal capability from the cold side, or exterior, of the supporting structure 302. This is different and advantageous over convention designs in which water cooled panels had to be removed or repaired from the interior of the structure or drop out box system. Moreover, the panels 308 can also be designed to be reversible so that the operating life of the element doubles with minimal cost and labor investment.

In other words, the water cooled elements or panels 308 may be designed and sized for easy handling, reversing or removal from the water cooled support structure and as a result material application to difficult wear or process areas can be addressed without removal of the entire installation. For example, if a water cooled panel 308 is beginning to show wear at a bottom portion thereof, the panel 308 may be simply removed from the support structure 302 and rotated 180° so that the worn, bottom portion is now oriented at the top. Further, the panel 308 may be reversed or flipped around such that the portion of the panel 308 facing inwardly may be reversed so that it now is facing outwardly and thus no longer exposed to hot gases and the like. Conventional water cooled panels were affixed the support structure via flanges, welding, bolts or fasteners, and other means such that an individual panel was not removable. Instead, the entire structure, including the support structure, had to be disassembled and replaced. In accordance with the present disclosure, however, individual panels 308 can be assembled or removed independently of other panels 308 in a simplified and quick process.

Each panel can vary in size, but in one example, the panel may be approximately 8'×20' and weigh over 40 pounds per square foot. The size and weight, however, of an individual panel may differ and likely depends upon the application and use of the panel, along with the size and shape of the surrounding support structure. The materials of manufacture of the water cooled elements or panels 308 can be adjusted to match the operating requirements for a specific area of the process equipment. These materials may include steel pipe, AmeriSpline®️ steel pipe, AmeriAntiSlag®️ steel pipe, copper pipe, copper splined pipe, bronze alloy pipe (e.g., AmeriBronze®️, AmeriHVP, etc.), nickel alloy or nickel coated steel pipe, or any new or other alloy that may be developed for pipe or tube manufacture, casting or extrusion. In addition, steel, bronze, copper and other alloy plate materials may be incorporated and be the base material for any water cooled element or panel 308.

The modular design of "cassette" style panels 308 may be used in this embodiment and provide operators with operating and maintenance options which are new to the aforementioned industries. As described above, these panels may be the first water cooled elements in the industry to have both sides of the panel usable for operational purposes. This means that, irrespective of the material of manufacture life, the operating life of the water cooled element may increase and, in some instances, double in operating life. All of the cassette panel designs may eliminate the need for maintenance personnel to enter the operating device to effect a cassette panel change or reversal. This eliminates the need to wait for the piece of equipment to cool down and reduces exposure to high temperature and carbon monoxide rich off-gases. In addition, all of the panels can be designed to be reversible, that is, when the first hot side shows any sign of wear, the panel can be reversed and utilized for twice the time of a conventional design.

In FIG. 3, each panel 308 may include a supply line or circuit 310 and a return line or circuit 312 through which water or other cooling liquid flows. The supply circuit 310 may be fluidly coupled to a supply header 304 which is further coupled to a fluid supply or reservoir (not shown). Each of the panels 308 may include its own supply circuit 310 fluidly coupled to the supply header 304. The supply header 304 may be formed of a pipe having a plurality of outlets fluidly coupled to each supply circuit. The water or liquid may flow into each panel 308 via the supply circuit 310 and exit therefrom via the return circuit 312. The return circuit 312 may be fluidly coupled to the return header 306, which is fluidly coupled to each of the plurality of panels 308 that form at least a portion of the drop out box system 300. Fluid that enters the return header 306 may be recirculated to the supply or reservoir, or it may flow to another reservoir.

Although not shown, fasteners and the like may be used to couple the supply circuits 310 and return circuits 312 to the respective panels and headers. Alternatively, flexible hoses may fluidly couple the headers to each circuit. In FIG. 3, the supply and return circuits are shown near a middle portion of the respective panel 308. As will be described, the location of where the supply and return lines are coupled to each panel can vary.

Figure 4:
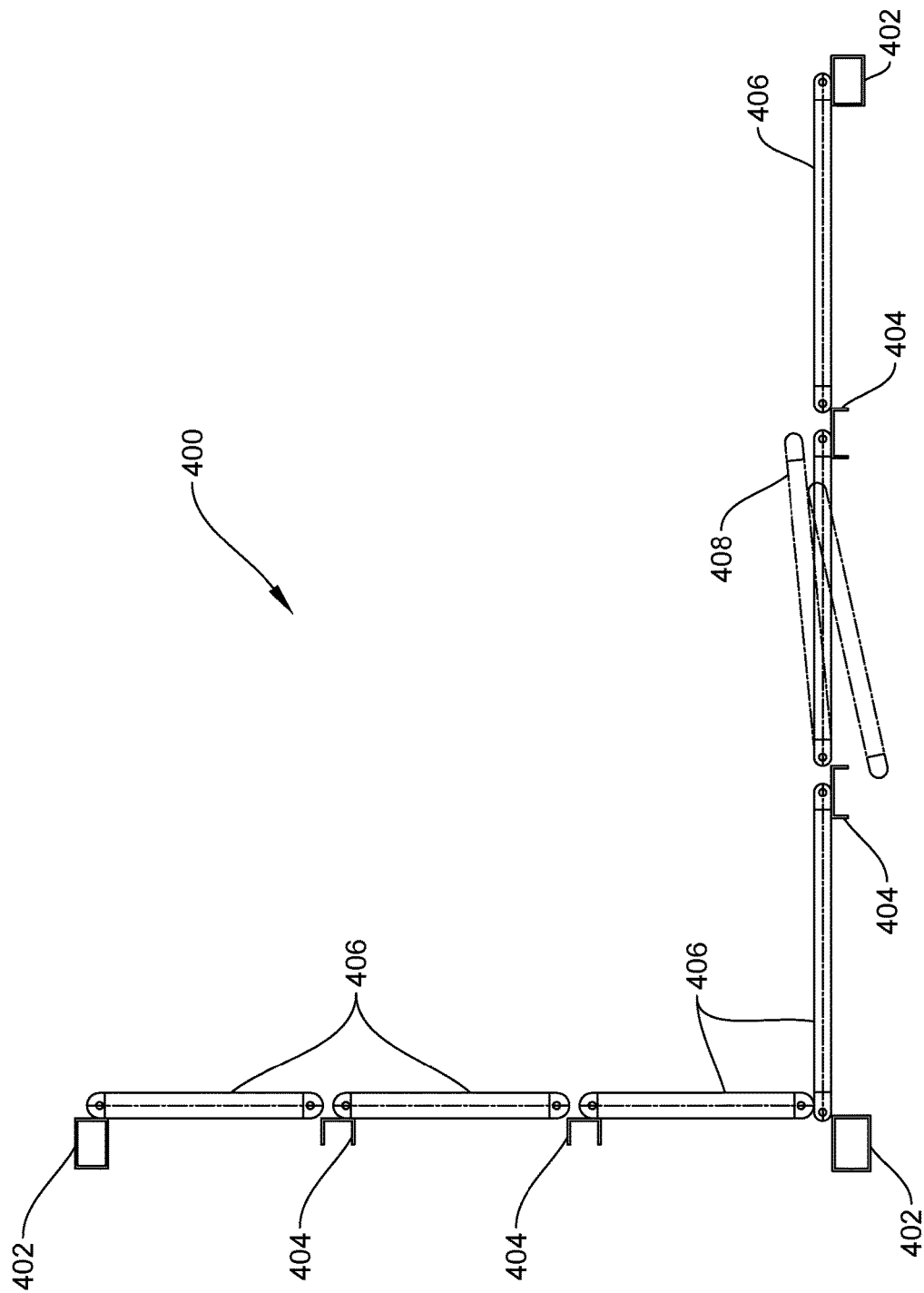
FIG. 4 is a top schematic view of a process of loading a liquid-cooled element from a cold side of a modular panel structure.

In FIG. 4, an example of an enclosure system 400 such as a combustion chamber or drop out box is illustrated. The system 400 may include a support structure formed by a square header or buckstay 402 and a plurality of intermediate buckstays 404. Although not shown in FIG. 4, the buckstay 402 and intermediate buckstays 404 can form a slot or channel through which an individual water cooled panel 406 may be assembled. Here, the panel 406 may slide into the buckstay slot at an angle such that a first side of the panel 406 is inserted into the slot from either the interior or exterior of the enclosure 400. Once the first end is inserted, sufficient space may be provided such that the opposite end of the panel 406 may be positioned with another slot formed in the support structure. This may be necessary when the area above the panel 406 is difficult to access due to other structure. In the event there is no obstructive structure above the panel 406, the panel 406 may also be inserted into the slots from above similar to a cassette or furnace filter.

In the embodiment of FIG. 4, it is further shown that the enclosure system 400 may be enclosed by a plurality of water cooled panels 406. Again, as described, an advantage with this design is such that if one of the panels 406 is damaged, the damaged panel 406 can either be reversed or reoriented in the slot so that an undamaged portion is facing inward or a replacement panel can be installed with very little downtime. Moreover, a maintenance personnel may access the damaged panel from outside the enclosure, and therefore time is not wasted by having to allow for the panel to cool down.

Referring to FIGS. 5 and 6, two embodiments are shown of an individual cassette-style water cooled panel 500 in its installed position. The cassette panel 500 may be installed between a pair of round headers or pipes 506. In an alternative design, the headers may be rectangular or square headers. The pipes 506 may include a supply header and a return header, for example. A protective panel 508 may be disposed on an interior 504, or hot side, of the panel 500 to provide a heat shield for protecting the header 506. As such, the header 506 may be located on an exterior 502, or cold side, of the panel 500. A pin and wedge attachment system may be used to couple the protective shield 508 to the header 506. Here, a pin 510 may be inserted through a pair of openings (not shown) in the header 506, and a wedge 512 may be driven through the pin 510 to prevent detachment. Further processing such as welding and the like may also be used to bolster the attachment.

In FIG. 6, a similar attachment mechanism may be used for coupling the protective panel 508 to the header 506. Here, a return line 600 is shown being fluidly coupled between a return header 506 and the water cooled panel 500 on one side, and a supply line 602 is fluidly coupled between a supply header 506 and the water cooled panel 500 on the opposite side. The return line 600 may be coupled to the return header 506 via a return fitting 608, and the supply line 602 may be coupled to the supply header 506 via a supply fitting 606.

Referring to FIG. 6, the water supply and return headers may be an integrated part of the permanent support structure. Water may be supplied and returned to the corresponding part of the structure via the water inlet and outlet connections on each water cooled element or panel 500. This may be possible with shut off valves to isolate each element and quick disconnect fittings and stainless steel hoses to allow for quick reversal and removal of the element. In FIG. 6, a shut-off valve or other valve mechanism 604 is shown fluidly coupled to the supply line 602 to either allow or shut off the fluid connection between the supply header 506 and the supply line 602.

Referring now to FIGS. 7-11, several embodiments of cassette panel assemblies are shown and will be described below. Here, each individual cassette panel assembly may be designed in several different embodiments. While several embodiments are illustrated, these are only examples and other assemblies that fall within the principles and teachings of this disclosure are contemplated.

In a first embodiment, for example, an enclosure 700 is shown including a plurality of cassette water cooled panels in which each panel may be slid into the support structure side walls from the exterior thereof (i.e., cold non-operating side) and in between supporting buckstays of the structure. In other words, a cassette panel design may be such that a cassette panel is slid into the support structure from a top portion and into a side track designed buckstay. The hot face of the buckstay/slideway may be protected against damage from hot furnace off-gases by a protective shield or water cooled panel. In this embodiment, the cassette panel will have a supply and return line coupling located in the body of the panel that will distribute water to the plurality of pipe including the cassette panel body. Water supply and return piping and fittings may connect the panel inlet and outlet to the respective header on the structure.

Figure 7B:
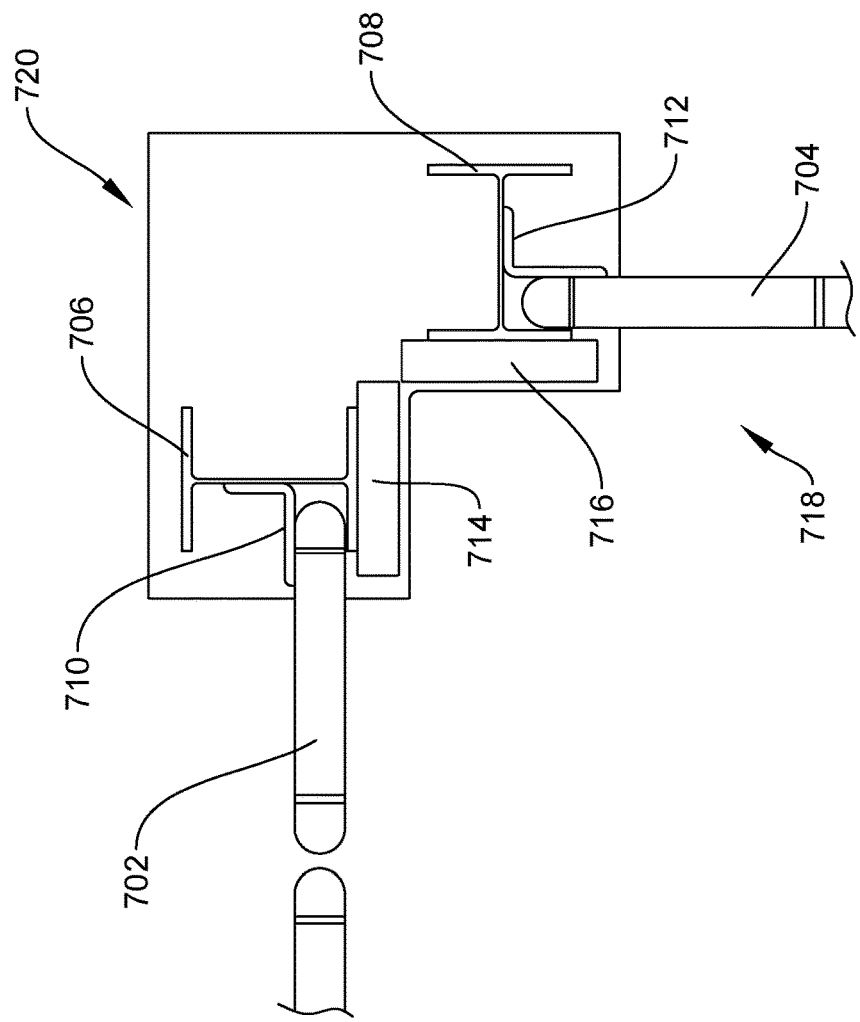
FIG. 7B is a top view of the modular panels of FIG. 7A.
Figure 7A:
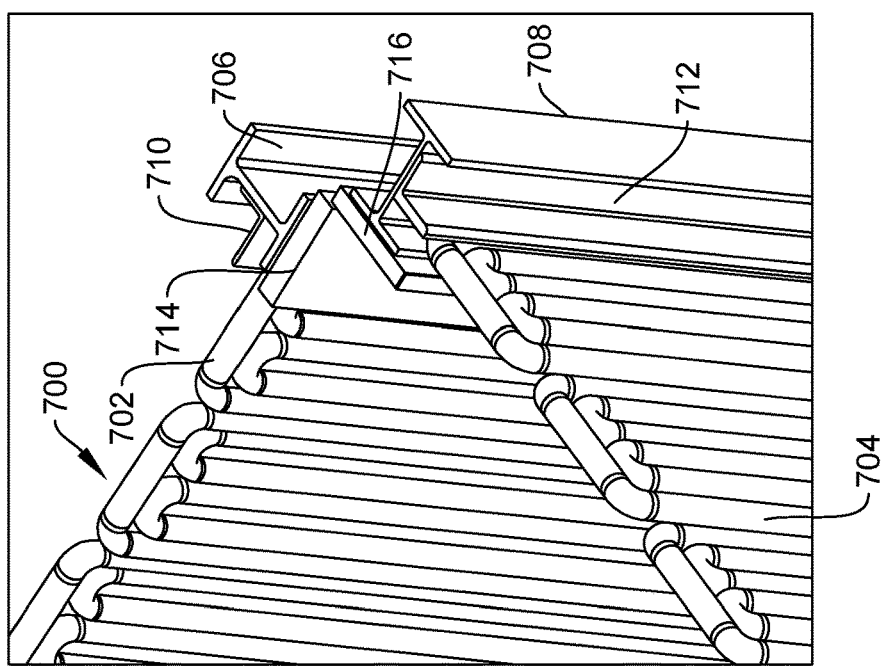
FIG. 7A is a partial perspective view of a first embodiment of modular panels assembled with an independent structure of an enclosure.

This first embodiment is partially shown in FIGS. 7A-B. Here, an example of a structure assembly and how the cassette panel assembly slides into position is illustrated. The cassette panel assembly 700 may have a supply and return line coupling (not shown) located in the body of the panel 700 that will distribute water to the plurality of pipe including the cassette panel body. Water supply and return piping and fittings (not shown) may connect the panel inlet/outlet (not shown) to the respective header on the structure.

In FIGS. 7A and 7B, the support structure may be formed by a first I-beam 706 and a first L-beam 710. The pair of beams may form a first buckstay. As shown in FIG. 7B, a slot is defined between the first I-beam 706 and the first L-beam 710 such that a first panel 702 may be slid into the slot for installation. A first protective panel 714 may be coupled to the first beam 706 to provide a heat shield on an interior side 718 of the enclosure 700.

A second water cooled panel 704 may likewise be assembled into a slot defined by a second I-beam 708 and a second L-beam 712. This too is shown in FIG. 7B. A second protective panel 716 may be coupled to the second I-beam 708 to provide a heat shield on an interior side 718 of the enclosure 700 and protect the second I-beam 708 and second L-beam 712 from hot gases and the like.

As shown in FIGS. 7A and 7B, the protective panels may be relatively narrow to correspond with the shape and width of the I-beams. The protective panels may include a design similar to the respective buckstay it is designed to protect.

Although not shown, each of the panels 702, 704 may include an inlet and an outlet for coupling to a supply line and return line, respectively. In some instances, flexible hoses may be coupled between the inlet/outlet and the supply header/return header. Other configurations are also possible as well.

In FIGS. 8A-B, a second embodiment of an enclosure system 800 is illustrated. In this embodiment, a cassette panel assembly may be slid into the structure from the top and into a side track designed buckstay. The hot face (i.e., portion facing the interior 818 of the system 800) of the slideway is protected against damage from hot furnace off-gases by a heat shield 814, 816 or water cooled panel. In this embodiment, the cassette panel may have a supply and return line coupling (not shown) located at the top portion of the panel that will distribute water to the plurality of pipe including the cassette panel body. Water supply and return piping and fittings (not shown) may connect the panel inlet and outlet to the respective header on the structure.

In this embodiment, a portion of the enclosure 800 is shown having a first water cooled panel assembly 802 and a second water cooled panel assembly 804. Each panel may be formed by sinuously winding pipe, as described above, in which a first end may form an inlet fluidly coupled to a supply header and a second end may form an outlet fluidly coupled to a return header. Here, a first supply header 806 may be fluidly coupled to an inlet (not shown) of the first panel 802, and a second supply header 808 may be fluidly coupled to an outlet (not shown) of the second panel 804. While the top pipe is described as being the supply header, in other embodiments it may be the return header. It is also contemplated within this disclosure that a flexible hose may fluidly couple the header to the inlet or outlet of the panel.

The support structure may include a first I-beam 810 and a second I-beam 812. A slot or channel may be formed in each I-beam 810, 812 so that the header 806, 808 is able to be coupled thereto. Moreover, each header may include a flange 820 for fitting within the designed slot. This is shown in FIG. 8B.

Similar to FIGS. 7A-B, the embodiment of FIGS. 8A-B may also include a protective member or panel that forms a heat shield to protect the support structure. Here, a first protective member 814 may be coupled to the first I-beam 810 and a second protective member 816 may be coupled to the second I-beam 812.

Figure 9B:
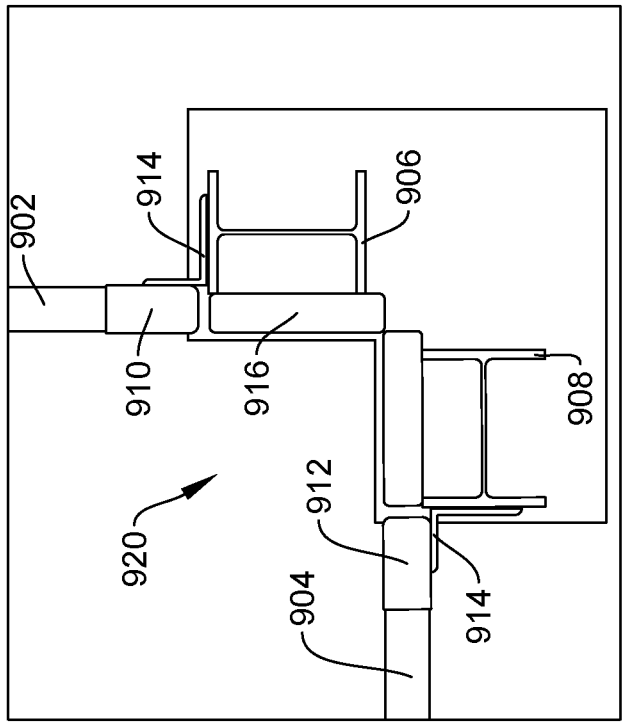
FIG. 9B is a top view of the modular panels of FIG. 9A.
Figure 9A:
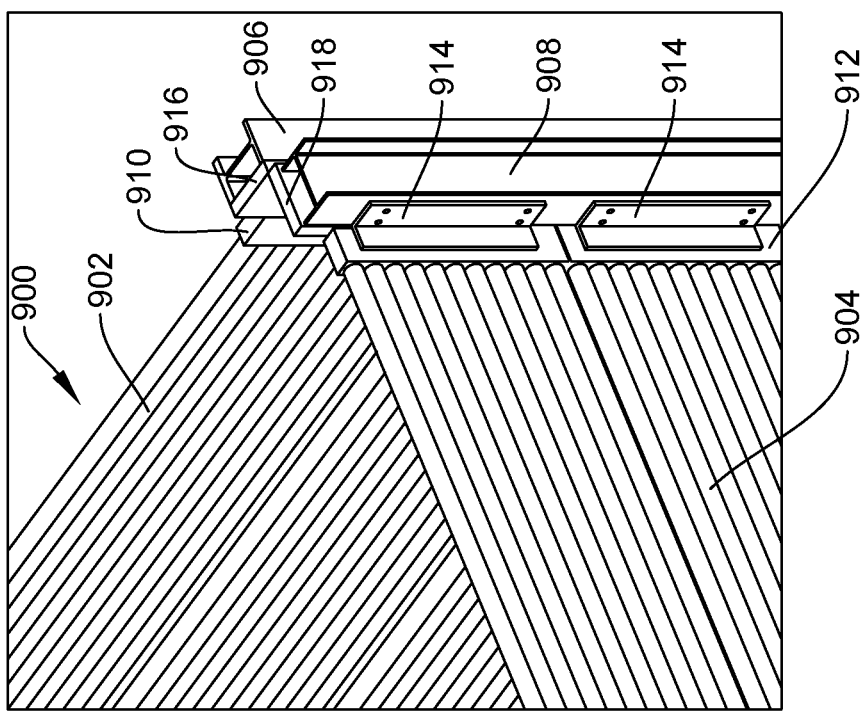
FIG. 9A is a partial perspective view of a third embodiment of modular panels assembled with an independent structure of an enclosure.

In a third embodiment shown in FIGS. 9A-B, a cassette panel assembly may be slid into the structure from the top or installing the panel from the cold side (i.e., exterior) of the furnace into a side track designed buckstay. The hot face of a slideway, i.e., part of the support structure, is protected against damage from hot furnace off-gases by a heat shield or water cooled panel. In this embodiment, the cassette panel may have supply and return fabricated headers on each side thereof (rather than on the top as in the embodiment of FIGS. 8A-B). The plurality of pipe including the body of the cassette panel may be welded into these side headers. A supply and return coupling (not shown) may be located on each side of the supply and return headers. The cassette panel water supply and return piping and fittings (not shown) may connect the panel inlet and outlet to the respective header on the structure.

Referring specifically to FIGS. 9A-B, a portion of an enclosure 900 such as drop out box system or combustion chamber is shown. The enclosure 900 may include a first water cooled panel 902 and a second water cooled panel 904. Each panel may be formed by sinuously winding pipe having an inlet for being fluidly coupled to a supply header and an outlet for being fluidly coupled to a return header. The supply and return headers may be formed in a first side support 910 or a second side support 912. In this way, the sinuously winding piping of the respective panels may be fluidly coupled to either side support for either receiving or returning fluid therefrom.

The side supports may be part of the overall support structure. The support structure may include a first I-beam 906 and a second I-beam 908. Retainer clips may be used to couple the buckstay (e.g., I-beams) to the respective panels. For example, a plate 914 may be tack welded to both the panel 902, 904 and I-beam 906, 908 to achieve a secure coupling. The plate 914 may comprise an L-shaped structure such that one portion of the structure is coupled to the panel and the other portion of the L-shaped structure is coupled to the I-beam, as shown in FIG. 9B.

A first protective member or panel 916 may be coupled to the first I-beam 906 on an interior side 920 to form a heat shield and protect the buckstay. Likewise, a second protective member or panel 918 may be coupled to the second I-beam 908 on an interior side 920 to form a second heat shield.

The panels 902, 904 may be easily disassembled from the exterior of the enclosure by removing the tack welded plates 914. This provides a safer and less time-consuming manner of repairing or replacing a damaged panel.

While the water supply and return may be routed through the side supports, it is also possible to run the supply and return lines through the square slot defined between the I-beam and protective member. In any event, in this embodiment, the supply and return lines may come from the side of each respective panel rather than from the top or bottom thereof.

Figure 10B:
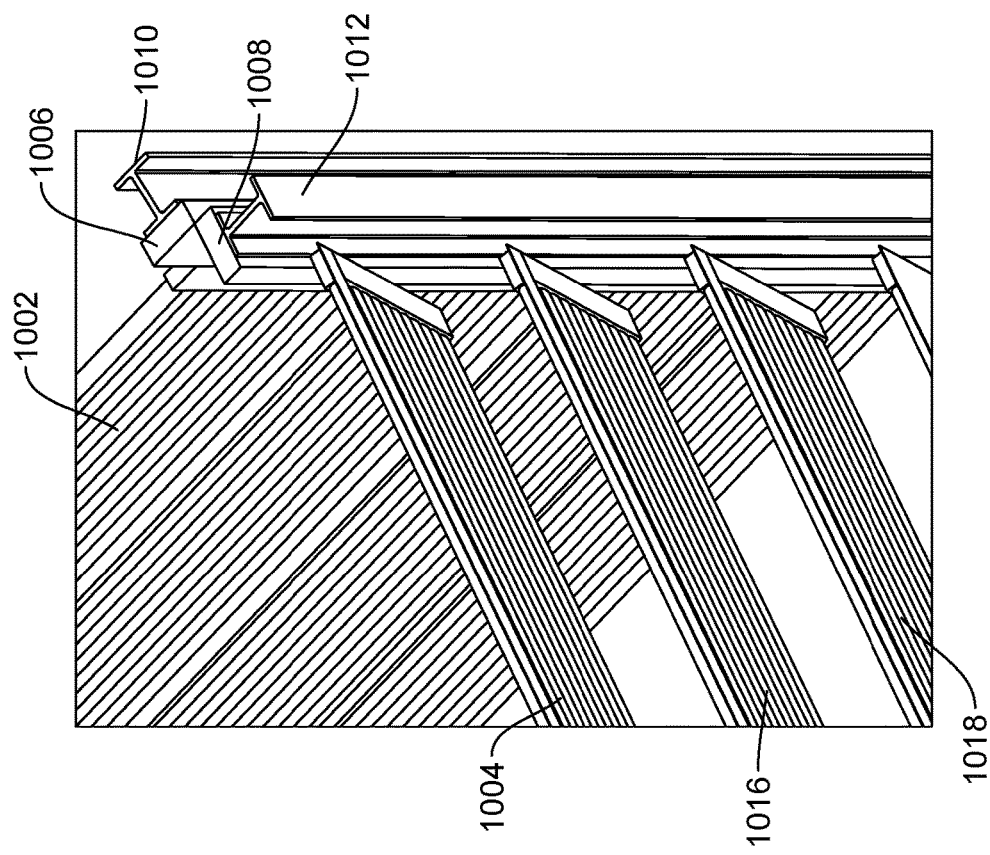
FIG. 10B is a second partial perspective view of the fourth embodiment of FIG. 10A.
Figure 10A:
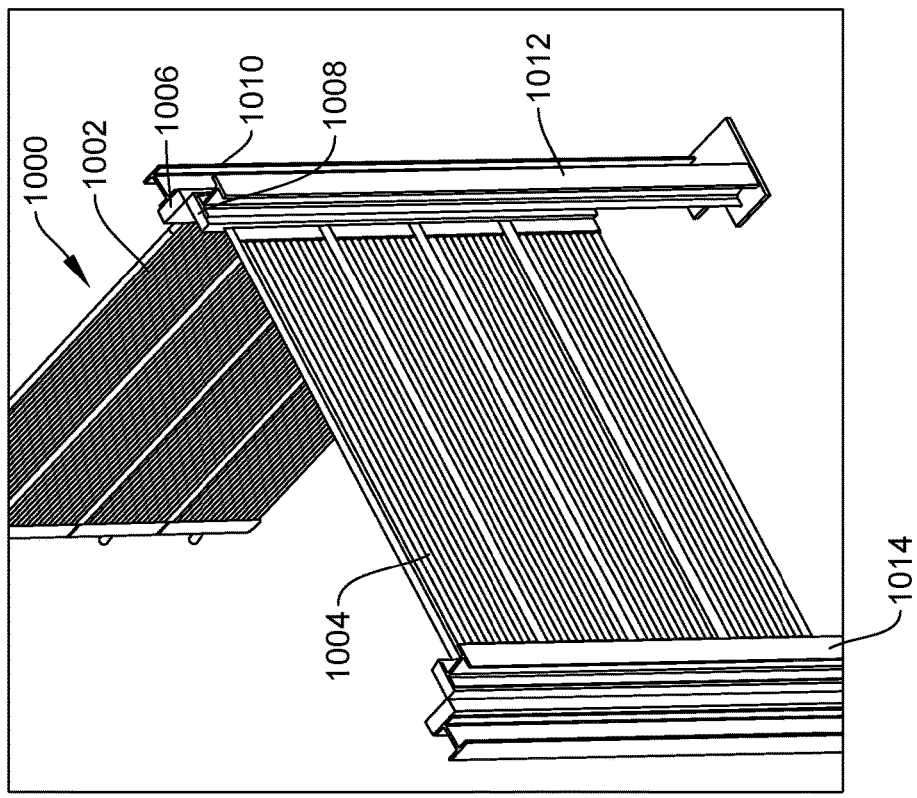
FIG. 10A is a partial perspective view of a fourth embodiment of modular panels assembled with an independent structure of an enclosure.
Figure 11:
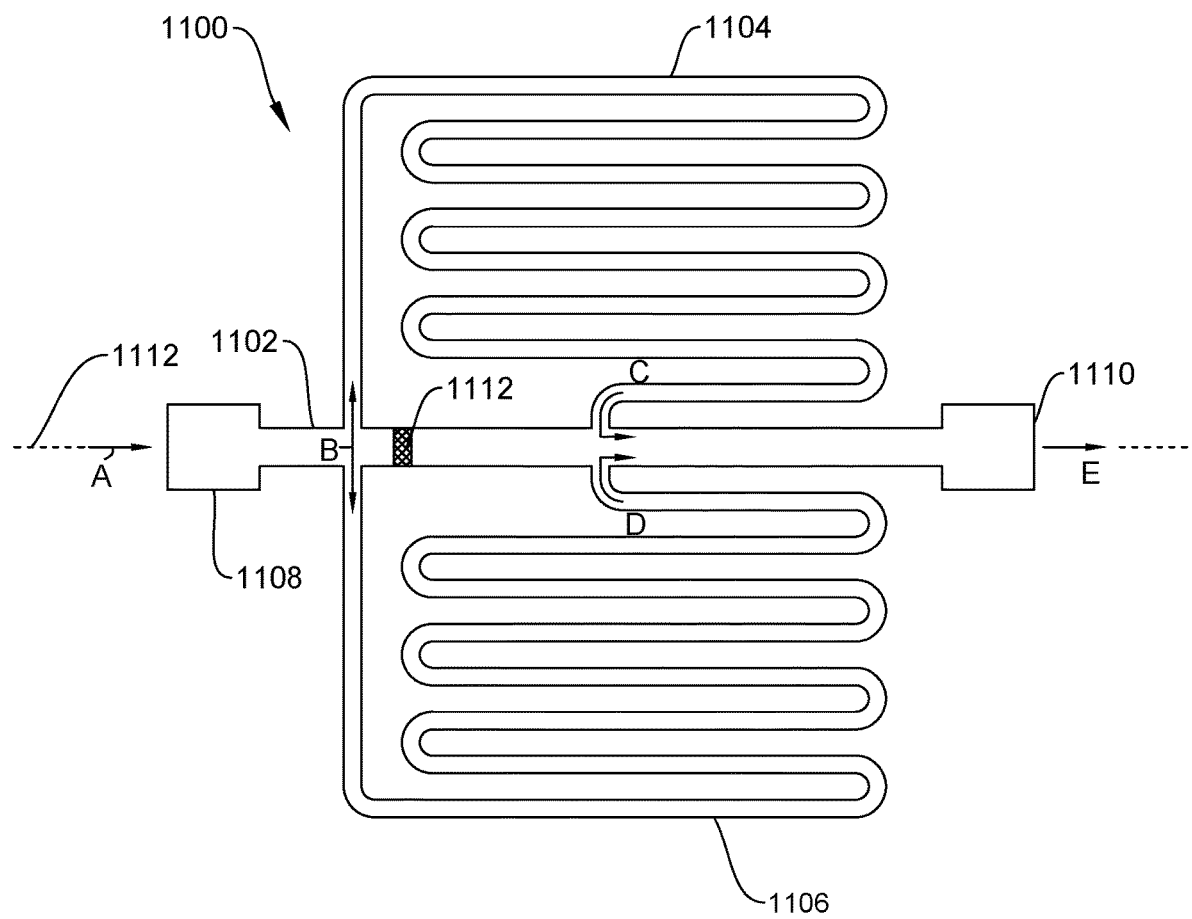
FIG. 11 is a schematic of a modular panel of the fourth embodiment of FIG. 10A.

In a fourth embodiment shown in FIGS. 10A, 10B and 11, a cassette panel assembly may be designed to rotate around a water cooled shaft integrated into the body of the cassette panel. In this design, the cassette panel can be either slid into the structure track or placed into position from the outside of the structure. The hot face, or interior side, of the slideway (i.e., buckway) is protected against damage from hot furnace off-gases by a water cooled member or panel (e.g., a heat shield). In this embodiment, the cassette panel body may have its water supply and return connections located on, in or along the shaft. The shaft may distribute to and collect water from the panel body (see FIG. 11). The cassette panel water supply and return piping and fittings may connect the panel inlet and outlet to the respective header on the structure. In this design, the panel can simply be rotated 180° when an interior-facing side of the panel is damaged or worn such that it faces outwardly or to an exterior.

In FIGS. 10A and 10B, a portion of an enclosure 1000 such as a drop out box system is shown. Here, a first panel 1002 and a second panel 1004 of a plurality of panels is shown forming side walls of the enclosure 1000. Each of the plurality of panels may be coupled to a support structure including one or more slideways, buckways, intermediate buckways, etc. The support structure may be formed by at least a first I-beam 1010, a second I-beam 1012, and a third I-beam 1014. The first and second I-beams form a corner of the support structure, as shown. A first protective member 1006 may serve as a heat shield to the first I-beam 1010, and a second protective member 1008 may serve as a heat shield to the second I-beam 1012. Each I-beam may be coupled to its own heat shield for protection against the hot fumes and gases from the furnace.

As shown in FIG. 10B, each panel of the plurality of panels may pivot about a pivot axis relative to the support structure. Here, the second panel 1004, a third panel 1016 and a fourth panel 1018 are shown pivoted with respect to a vertical plane through which the second I-beam 1012 is aligned. This may be desirable such that one side of the panel facing the interior of the enclosure is exposed continuously to hot gases, fumes and debris. This face may become worn or damaged over time. Rather than replacing the panel, the panel may be rotated about its pivot axis 1112 so that the worn side faces outwardly rather than inwardly. The unworn or non-damaged side of the panel now face inwardly. This allows the panel to be used for a longer period of time and increases the productivity of the system. Moreover, the panel may be rotated from the exterior of the enclosure, which allows such maintenance and repair to be carried out without having to cool the enclosure. This also reduces the personnel's exposure to the fumes and gases, and thus provides a safer work environment.

An example of this type of panel is shown in FIG. 11. Here, the panel 1100 may include an elongated shaft 1102 that extends therethrough. The shaft 1102 may extend through a center or middle section of the panel 1100, or it may be located closer to a top portion or bottom portion of the panel. In FIG. 11, the shaft 1102 is approximately in the middle of the panel 1100.

The shaft 1102 defines the pivot axis 1112 of the panel 1100. In other words, the panel 1100 may rotate about the shaft 1102. Although not shown, the shaft 1102 may be pivotally disposed between bearings at each end. The bearings may be located within the buckstay or support structure, for example.

A first circuit 1104 may be located above the shaft 1102 and a second circuit 1106 below the shaft. The shaft 1102 may include a first fitting 1108 and a second fitting 1110 for coupling to a pair of buckstays or support structures. Further, the shaft 1102 may be hollow except for a plug or stop 1112 located therein. In FIG. 11, the stop 1112 is located closer to a supply side of the shaft 1102. The location of the stop 1112 may vary, but it is likely located closer to the inlets of the first and second circuits as shown in FIG. 11.

Water or other liquid may be supplied to the shaft 1102 via supply line A. As the water enters the shaft 1102, it is forced into the first and second circuits 1104, 1106 due to the stop 1112. The water or cooling liquid may then flow through the sinuously winding piping of the first and second circuits via path B. The water or liquid may exit the respective circuits and return to the shaft at the outlets C and D. The water or liquid may then exit the shaft 1102 and flow to the return line E as shown in FIG. 11.

With the shaft 1102 being rotatably coupled to the support structure, the panel 1100 may be rotated or pivoted as desired. Valves may be provided for each panel to shut off the supply of water to the respective circuits. Moreover, there is no supply or return line fluidly coupled to the circuits, but rather only through the shaft 1102 in the illustrated embodiment. In other embodiments, however, water or other cooling fluid may be supplied to the panels at other locations including the top, bottom, either side or in the middle (e.g., via flexible hoses).

In cases where a flexible hose is coupled to a front face of the panel so that water or other cooling liquid may be supplied to the panel, the face having the hoses (i.e., for supply and return) is positioned to the cold side or outside of a drop out box or combustion chamber enclosure. This allows direct access to the hoses, the supply inlet and return outlet without having to be inside the enclosure. When a rear face of the panel is damaged and the panel is going to be flipped such that the front face is now on the interior or hot side of the enclosure, the flexible hoses are detached therefrom. Moreover, the inlet and outlet on the front face may be patched via a welding operation to prevent leaks therefrom. On the rear face of the panel, a new inlet and a new outlet may be machined into the piping and fittings installed so that the supply and return lines may be reconnected to the panel, but to the opposite face.

Further, in some instances only a portion of one face of the panel is damaged or worn. For example, it may be determined that a bottom portion of the rear face of a panel is worn, whereas the rest of the panel is in good operating condition. In this instance, the panel may be rotated 180° so that the bottom portion of the rear face is now on top, but the rear face is still oriented towards the interior of the enclosure. In doing so, and particularly when the inlet and outlet on the front face are located in the body of the panel (rather than when at the top, bottom or sides), the supply and return flexible hoses need to have enough length to reconnect to the panel to the respective inlet and outlet. In other words, the inlet may always be the inlet, and the outlet may always be the outlet such that the supply hose is connected to the inlet and the return hose is connected to the outlet regardless of the orientation of the panel.

In some embodiments, however, a first opening in the panel may be the inlet in a first orientation of the panel, but the first opening may comprise the outlet in a different orientation. Thus, the panels may have some flexibility as to the location of the inlet and outlet based on its positioning or orientation with respect to the support structure.

It may be desirable that these water cooled elements or panels are sized for easy removal or reversal from the outside or top of the structure (i.e., cold side) which is safe from the high temperature (e.g. 2,500+° F.), high carbon monoxide and caustic gases inside the chamber.

In the aforementioned embodiments of FIGS. 7-9, the water cooled elements or panels may be slid into panel guideways designed into the structure wherever possible. In some instances, the water cooled elements or panels may require brackets to attach them to the independent structure. However, the water cooled elements can be reversible so that if bracketing is required on the cold side, it may be easily removed and transferred to the water cooled element opposite side for continued used.

In this disclosure, the water cooled elements may be formed with small and manageable sizes. As a result, the hot face internal structure of the chamber may also allow the possibility to implement panel reversal or repairs, as desired, on localized damage without the need to take the system down for costly scheduled or unscheduled downtime repairs.

Further, each of the water cooled elements may have dedicated water supply and return lines that are connected to the independent structure's respective headers via piping and stainless steel flexible hoses with quick disconnect features. As a result, this allows for the water cooled element to be easily and quickly removed, reversed and/or replaced as necessary.

Depending on the design of the independent structure, it may be necessary to have a protective water cooled element to be located on the hot side or interior side of the independent structure buckstay. If required, the protective water cooled member or heat shield may be attached to the buckstay and abuts the water cooled elements on either side of the buckstay. An example of a buckstay water cooled element protective panel is shown in FIGS. 7-10 of this disclosure.

Each of the water cooled element supply and/or return lines may include a valve 64 so that, in the event of a water leak, the water cooled element can be isolated from water flow. The return lines of the water cooled elements are designed to include a pressure relief valve and thermocouple/RTD to measure the water temperature existing in the panel to measure the water temperature change. In the event of an escalating temperature in the panel, water flow can be shut down or the panel can be removed and replaced before any scheduled or unscheduled shutdown occurs. This new panelized design provides isolation of any water leak to a small panel rather than a complete wall section of a typical water cooled duct, combustion chamber, drop out box, etc., which is not possible in conventional design monolithic or large panelized structures. As a result, the furnace operator may only deal with a small issue versus a potentially larger or even catastrophic effect of water leakage into the process system.

In the present disclosure, the embodiments described herein represent a significant technological enhancement that may substantially decrease operating cost and both scheduled and unscheduled downtime. One reason for this is because the embodiments described and illustrated herein may increase the operating life of the support structure, which is a more permanent structure. Moreover, the support structure is designed with the required support slots and brackets for easy insertion and removal of the "cassette" water cooled element from the cold side of the equipment. In effect, this protects the operator or maintenance staff from an injury that may occur when working in a confined space with high temperatures, potentially high carbon monoxide, and dusty gases.

In addition, the water cooled elements may be reversible for operating use on both sides thereof. This increases and, in some instances, doubles the operating life of the cassette panel. Further, the water cooled elements may be desirably sized for handling, and the ability to adapt to whatever manufacturing material is needed to maximize operating life in the specific area and use of the device. The embodiments of the present disclosure may provide an improved process and enhance facility operational safety as well as personnel safety, especially during water cooled element repair and replacement activities.

While the water-cooled or liquid-cooled panels are shown and described as being used with a drop out box, it is also possible to use these panels in a combustion chamber, a duct, an electric arc furnace upper shell, an exhaust system, or other enclosure where hot gases, fumes, and particulates are found. The size and shape of the panels may be customized to the location. While the panels are designed for vertical arrangement in which each panel is inserted into a slot from above, the panels may also be arranged horizontally where each panel is inserted into slots from the side. Alternatively, and particularly when working at higher elevations from the ground, it may be possible to insert the panels from below and into slots. A mechanism or latch may be used to hold the panel in place.

Figures 13A, 13B, 13C:
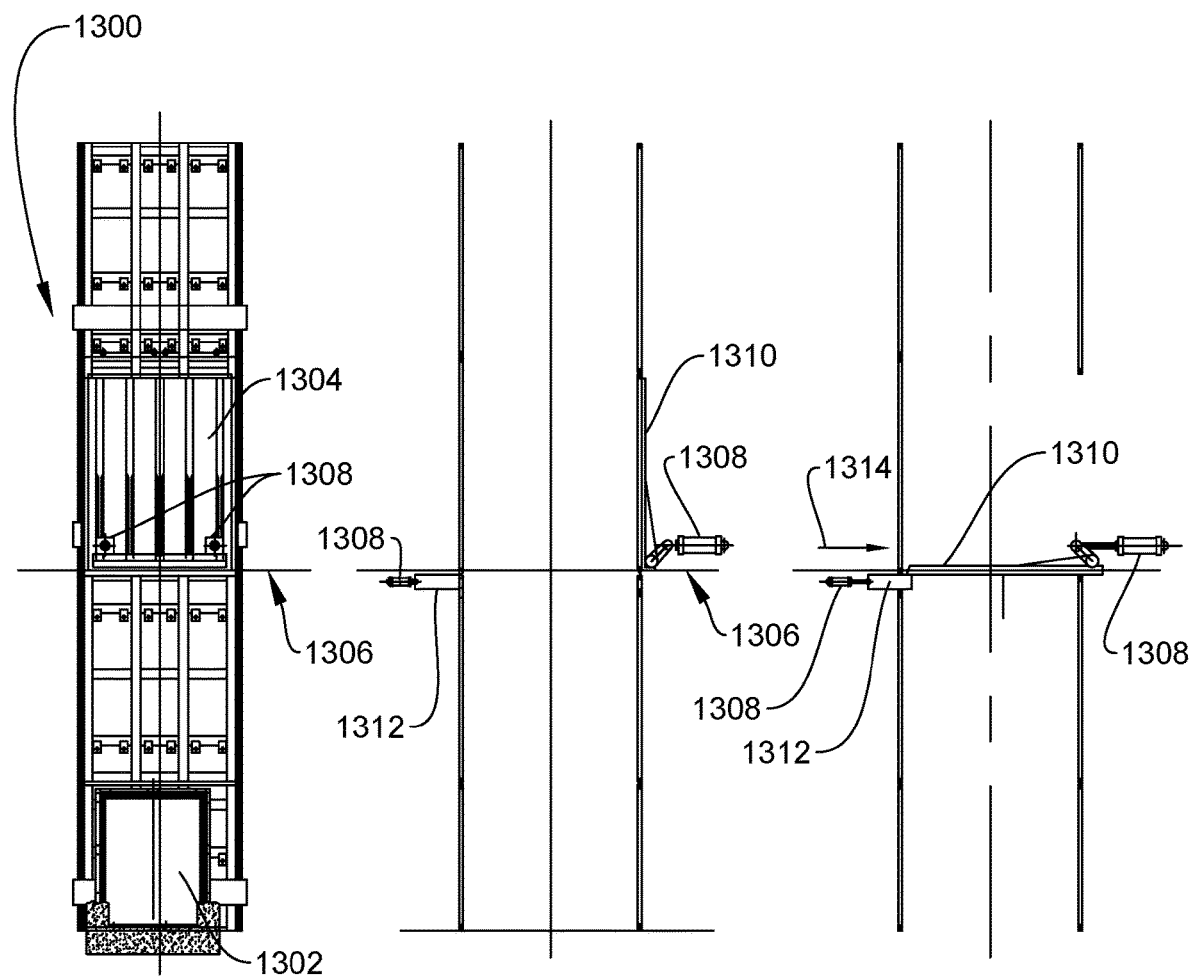
FIG. 13A is a schematic of a drop out box of an electric arc furnace having a plurality of modular panels.
FIG. 13B is a schematic of the drop out box of FIG. 13A with a modular panel in its substantially vertical orientation.
FIG. 13C is a schematic of the drop out box of FIG. 13A with the modular panel in its substantially horizontal orientation.

Referring now to FIGS. 13A-C, a different embodiment of the present disclosure is shown. Here, a drop out box 1300 or other enclosure is shown. The drop out box 1300 may be 40' or higher, and it may include the type of support structure and water cooled panels 1304 as described herein. The drop out box 1300 may include an entrance 1302 similar to the doors 132 of FIG. 1. In this example, the drop out box 1300 may include one more levels or floors 1306 associated therewith. In FIG. 13, for example, a mezzanine level 1306 is shown. In some cases, it can be difficult to reach a panel 1304 located above the mezzanine level 1306. While a ladder may be useful, it may only reach so high. Scaffolding or other lifts may not fit within the enclosure.

Thus, to reach the higher elevations within the enclosure 1300, one of a plurality of panels 1304 may be used to form a floor surface at the mezzanine level 1306 or any other level. In FIGS. 13B and C, the panel 1308 may be controllably actuated by a cylinder or actuator 1308 between a raised position (FIG. 13B) and a lowered position (FIG. 13C). In the lowered position, the panel 1310 may be substantially horizontal and held in place by a latching system 1312. The latching system 1312 may be controlled by a mechanical, hydraulic, electric, electro-mechanical, pneumatic, or any other type of actuator 1308. The same is true for controlling the floor panel 1310. In the lowered position of FIG. 13C, a ladder or other device may be placed on the panel 1310 to reach a water cooled panel located above the mezzanine level 1300. Other types of systems for controlling movement of the floor panel are possible with this system, and the aforementioned actuator is only such example. The same is true for controlling the latching system 1312. Any known system for coupling and holding the floor panel in its lowered position may be used in this system.

While exemplary embodiments incorporating the principles of the present disclosure have been disclosed herein, the present disclosure is not limited to the disclosed embodiments. Instead, this disclosure is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A drop out box of a steel-making furnace system, comprising:
   a support structure comprising a frame that defines an interior;
   a supply line for supplying a cooling liquid from a reservoir;
   a return line fluidly coupled to the supply line and the reservoir; and
   a plurality of panels comprising sinuously winding piping having an inlet and an outlet, the inlet being fluidly coupled to the supply line and the outlet being fluidly coupled to the return line;
   a supply header and a return header each formed in the support structure;
   wherein, the frame comprises a plurality of support members spaced from one another, where each of the plurality of support members defines a slot;
   wherein, each of the plurality of panels is removably and slidably received with the slot for coupling to the frame;
   wherein, the supply header is fluidly coupled to the supply line and the return header is fluidly coupled to the return line.

2. The drop out box of claim 1, further comprising a first flexible hose for coupling the supply line to the inlet and a second flexible hose for coupling the return line to the outlet.

3. The drop out box of claim 1, wherein:
   the supply header is disposed along a top portion of the plurality of panels and coupled to the frame; and
   the return header is disposed along a bottom portion of the plurality of panels and coupled to the frame.

4. The drop out box of claim 3, wherein the inlet of each of the plurality of panels is located at the top portion and the outlet of each of the plurality of panels is located at the bottom portion.

5. The drop out box of claim 1, wherein:
   the supply header is disposed along a bottom portion of the plurality of panels and coupled to the frame; and
   the return header is disposed along a top portion of the plurality of panels and coupled to the frame.

6. The drop out box of claim 5, wherein the inlet of each of the plurality of panels is located at the bottom portion and the outlet of each of the plurality of panels is located at the top portion.

7. The drop out box of claim 1, wherein:
   the supply header is disposed along a first side portion of the plurality of panels and coupled to the frame; and
   the return header is disposed along a second side portion of the plurality of panels and coupled to the frame, the first side portion being opposite the second side portion.

8. The drop out box of claim 7, wherein the inlet of each of the plurality of panels is located at the first side portion thereof and the outlet of each of the plurality of panels is located at the second portion.

9. The drop out box of claim 1, further comprising a valve fluidly coupled to each inlet of the plurality of panels, the valve configured to control the supply of cooling liquid to each panel.

10. The drop out box of claim 1, wherein the support structure comprises a buckstay and a protective panel, the protective panel disposed on an interior side of the buckstay.

11. The drop out box of claim 10, wherein each of the plurality of panels is disposed between the buckstay and the protective panel.

12. The drop out box of claim 1, wherein the plurality of panels comprises a first face and a second face, the plurality of panels being reversible such that either the first face or the second face is disposable to face the interior.

13. The drop out box of claim 12, wherein the plurality of panels comprises a first end and a second end, the plurality of panels being disposed within the slot such that either the first end or the second end is positioned at a top of the drop out box.

14. An enclosure of a steel-making furnace system, comprising:
   a support structure comprising a frame that defines an interior;
   a supply line for supplying a cooling liquid from a reservoir;
   a return line fluidly coupled to the supply line and the reservoir;
   a supply header and a return header each formed in the support structure;
   a plurality of panels comprising sinuously winding piping and a shaft having an inlet and an outlet, the inlet being fluidly coupled to the supply line and the outlet being fluidly coupled to the return line; and a plug located within the shaft between the inlet and the outlet, the plug configured to direct a flow of the cooling liquid through the sinuously winding piping;

wherein, the supply header is fluidly coupled to the supply line and the return header is fluidly coupled to the return line;

wherein, the frame comprises a plurality of support members spaced from one another, where each of the plurality of support members defines a slot;

wherein, each of the plurality of panels is removably and slidably received with the slot for coupling to the frame; and wherein, a first end of the shaft is coupled to a first support member and a second end of the shaft is coupled to a second support member, the first and second support members being spaced from one another.

15. The enclosure of claim 14, wherein the shaft defines a pivot axis about which the at least one panel is pivotally coupled to the first and second support members.

16. The enclosure of claim 15, wherein the at least one panel comprises a first face and a second face, the at least one panel being coupled to the first and second support members such that either the first face or the second face is oriented towards the interior.

17. The enclosure of claim 16, wherein the at least one panel is pivotable about the pivot axis such that the first face is positioned towards the interior during a first period of time, and the at least one panel is pivoted after the first period of time such that the second face is positioned towards the interior.

18. The enclosure of claim 14, wherein:
the sinuously winding piping comprises a first circuit of sinuously winding piping and a second circuit of sinuously winding piping;
the first circuit of sinuously winding piping including a first inlet and a first outlet;
the second circuit of sinuously winding piping including a second inlet and a second outlet; and
the first and second inlets being fluidly coupled to the shaft inlet and the supply line, and the first and second outlets being fluidly coupled to the shaft outlet and the return line.

19. A steel-making furnace system, comprising:
a furnace comprising a hearth, an upper shell having one or more cooling panels, and a removable roof structure for covering a top end of the upper shell;
an exhaust system disposed in fluid communication with the furnace, the exhaust system configured to transfer fumes and hot gases from the furnace to an exhaust chamber; and
a drop out box located below the exhaust chamber and defining an enclosure for receiving debris and other particulates from the fumes and hot gases, the drop out box comprising:
a support structure comprising a frame that defines an interior of the enclosure;
a supply line for supplying a cooling liquid from a reservoir;
a return line fluidly coupled to the supply line and the reservoir;
a supply header and a return header each formed in the support structure; and
a plurality of panels removably coupled to the support structure and comprising sinuously winding piping having an inlet and an outlet, the inlet being fluidly coupled to the supply line and the outlet being fluidly coupled to the return line;
wherein, the supply header is fluidly coupled to the supply line and the return header is fluidly coupled to the return line;
wherein, the frame comprises a plurality of support members spaced from one another, where each of the plurality of support members defines a slot;
wherein, each of the plurality of panels is removably and slidably received with the slot for coupling to the frame;
wherein, the plurality of panels comprises a first end, a second end, a first face and a second face, each of the plurality of panels being reversible such that the panel is coupled to the frame with either the first face or the second face oriented towards the interior of the enclosure;
further wherein, each of the plurality of panels being disposable within the slot such that either the first end or the second end is positioned closer to the exhaust chamber.

* * * * *